US008182005B2

(12) United States Patent
Liu et al.

(10) Patent No.: US 8,182,005 B2
(45) Date of Patent: May 22, 2012

(54) CYLINDER LOCK WITH REINFORCEMENTS TO IMPROVE STRUCTURAL STRENGTH

(75) Inventors: Cheng-Chung Liu, Chiayi County (TW); Lan-Kun Don, Chiayi (TW)

(73) Assignee: Tong Lung Metal Industry Co., Ltd., Chia-Yi (TW)

( * ) Notice: Subject to any disclaimer, the term of this patent is extended or adjusted under 35 U.S.C. 154(b) by 1065 days.

(21) Appl. No.: 12/051,902

(22) Filed: Mar. 20, 2008

(65) Prior Publication Data

US 2008/0168809 A1 Jul. 17, 2008

Related U.S. Application Data

(63) Continuation-in-part of application No. 11/652,834, filed on Jan. 12, 2007, now Pat. No. 7,748,758.

(30) Foreign Application Priority Data

Mar. 22, 2007 (TW) .............................. 96204677 U

(51) Int. Cl.
*E05B 1/00* (2006.01)
*B60R 25/02* (2006.01)

(52) U.S. Cl. ......... 292/347; 292/DIG. 53; 292/DIG. 54; 292/DIG. 64; 70/224

(58) Field of Classification Search .................. 292/337, 292/346, 347, DIG. 53, DIG. 54, DIG. 64; 70/224, 448, 449
See application file for complete search history.

(56) References Cited

U.S. PATENT DOCUMENTS

| | | | | | |
|---|---|---|---|---|---|
| 1,829,815 | A * | 11/1931 | Schlage | 292/337 |
| 2,538,688 | A | 1/1951 | Heyer | |
| 2,733,088 | A * | 1/1956 | Fisler | 292/1 |
| 2,751,243 | A * | 6/1956 | Biblin | 292/337 |
| 2,800,351 | A * | 7/1957 | Schmid | 292/337 |
| 3,116,080 | A * | 12/1963 | Williams | 292/1 |
| 3,503,233 | A * | 3/1970 | Armstrong et al. | 70/370 |
| 4,272,975 | A * | 6/1981 | Patriquin | 70/369 |
| 4,428,212 | A * | 1/1984 | Best et al. | 70/224 |
| 5,265,924 | A * | 11/1993 | Kim | 292/336.3 |
| 5,335,948 | A | 8/1994 | Norton, II et al. | |
| 5,481,890 | A * | 1/1996 | Millman | 70/224 |
| 5,564,296 | A * | 10/1996 | Theriault et al. | 70/224 |
| 5,775,745 | A * | 7/1998 | Hoppe et al. | 292/138 |
| 5,983,687 | A * | 11/1999 | Shen | 70/467 |
| 6,497,126 | B2 * | 12/2002 | Wang | 70/472 |
| 6,575,006 | B1 * | 6/2003 | Don | 70/472 |
| 6,698,803 | B2 | 3/2004 | Furlong | |
| 6,893,059 | B2 | 5/2005 | Shen | |
| 6,935,148 | B2 * | 8/2005 | Don | 70/472 |
| 7,066,507 | B2 * | 6/2006 | Don | 292/336.3 |
| 7,748,758 | B2 * | 7/2010 | Fang et al. | 292/347 |
| 2006/0042333 | A1 * | 3/2006 | Wu | 70/224 |
| 2007/0028657 | A1 | 2/2007 | Huang et al. | |
| 2007/0096479 | A1 | 5/2007 | Lin et al. | |
| 2009/0211318 | A1 * | 8/2009 | Pilotelli | 70/141 |

* cited by examiner

*Primary Examiner* — Carlos Lugo
(74) *Attorney, Agent, or Firm* — Ladas & Parry LLP

(57) ABSTRACT

A cylinder lock includes a shell that has an enlarged tubular section, and a constricted tubular section. A retractor case that contains a latch retractor for retracting a latch is disposed within the enlarged tubular section. An inner surface of the enlarged tubular section is provided with an interlocking unit that interlocks with the retractor case to prevent relative rotational movements of the retractor case and the shell. In an embodiment, the retractor case has at least one tongue extending radially between a pair of annularly spaced apart interlocking elements of the interlocking unit.

8 Claims, 8 Drawing Sheets

CYLINDER LOCK WITH REINFORCEMENTS TO IMPROVE STRUCTURAL STRENGTH

CROSS-REFERENCE TO RELATED APPLICATION

This application is a Continuation-In-Part application of U.S. patent application Ser. No. 11/652,834 filed on Jan. 12, 2007. This application also claims priority of Taiwanese Patent Application No. 096204677 filed on Mar. 22, 2007.

BACKGROUND OF THE INVENTION

1. Field of the Invention

This invention relates to a cylinder lock, more particularly, to a cylinder lock having improved structural strength.

2. Description of the Related Art

A cylinder lock typically includes a drive mechanism connected to inner and outer handles and including a latch retractor to retract a latch unit which can latch or unlatch a door. The drive mechanism generally includes a shell receiving a retractor case that contains the latch retractor, and inner and outer drive spindles connected respectively to the inner and outer handles. The inner and outer drive spindles extend into the shell and connect the latch retractor so that the latch retractor can be operated through the inner drive spindle and the inner handle, or through the outer drive spindle and the outer handle. The latch retractor is biased by a biasing spring so that the latch unit is normally moved to a latching position. When the latch retractor is operated by rotating the inner or outer handle, the latch retractor retracts the latch unit to an unlatching position.

Among the components of such a cylinder lock, the outer drive spindle and the retractor case are most liable to be damaged due to frequent rotation of the handles or due to improperly or destructively applied external forces. Improvements have been suggested in the art to strengthen such cylinder locks. An example thereof is disclosed in U.S. Pat. No. 6,893,059.

SUMMARY OF THE INVENTION An object of the present invention is to provide a cylinder lock with an improvement to increase torsional, tension and compressive strength of the cylinder lock.

According to the present invention, a cylinder lock comprises: an inner handle; an inner drive spindle connected to the inner handle; a latch retractor driven by the inner drive spindle and adapted to retract a latch; a retractor case having inner and outer cover plates, and a middle cage connected between the inner and outer cover plates and receiving the latch retractor, each of the inner and outer cover plates having a central hole, and at least one radially extending tongue; and a housing receiving the retractor case and having an inner surface provided with at least one interlocking unit including a pair of interlocking elements that are disposed in the inner surface and that are spaced apart annularly. Each of the tongues extends between and engages the interlocking elements.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
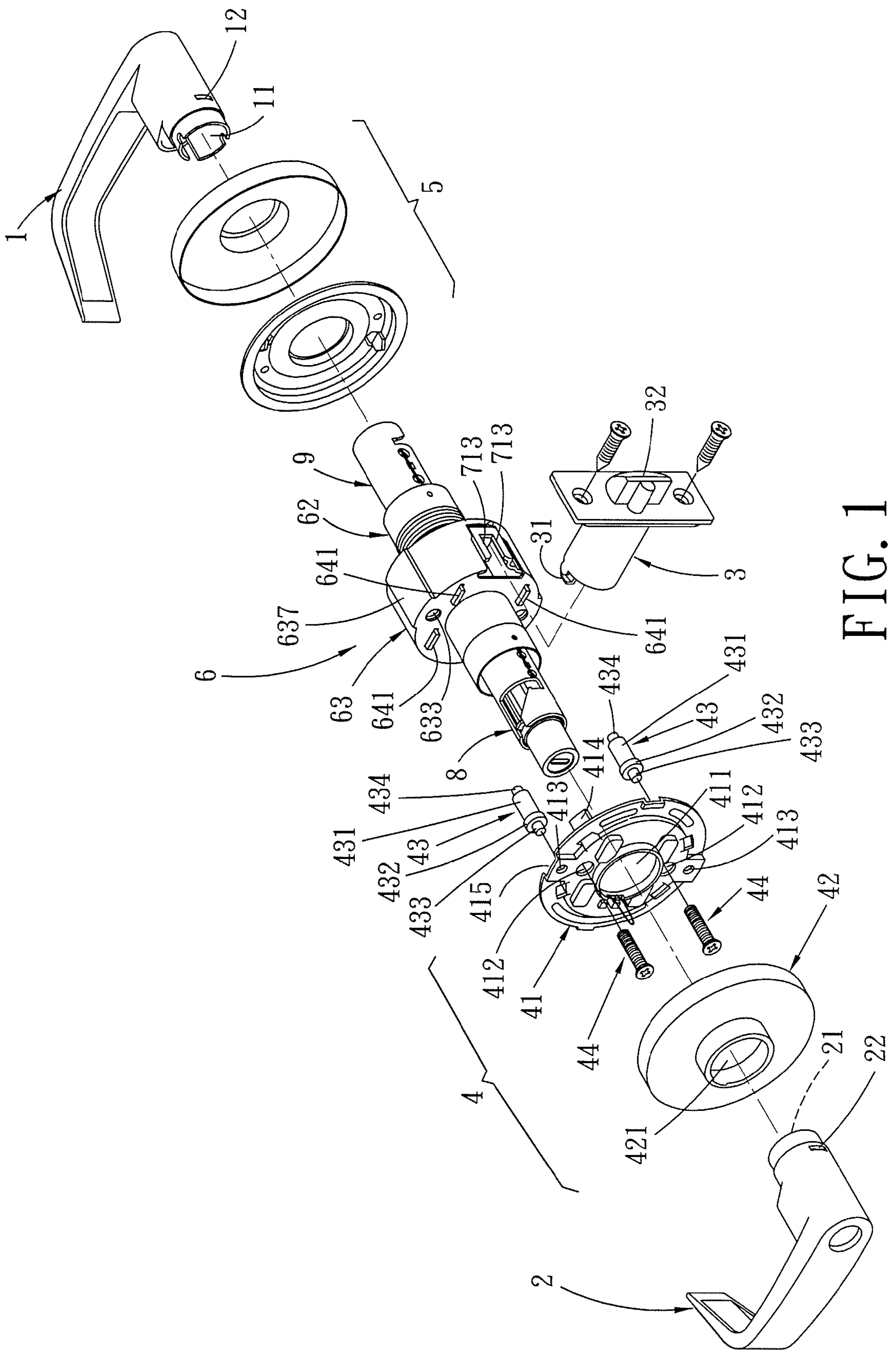
FIG. 1 is an exploded view of a cylinder lock embodying the present invention.
Figure 2:
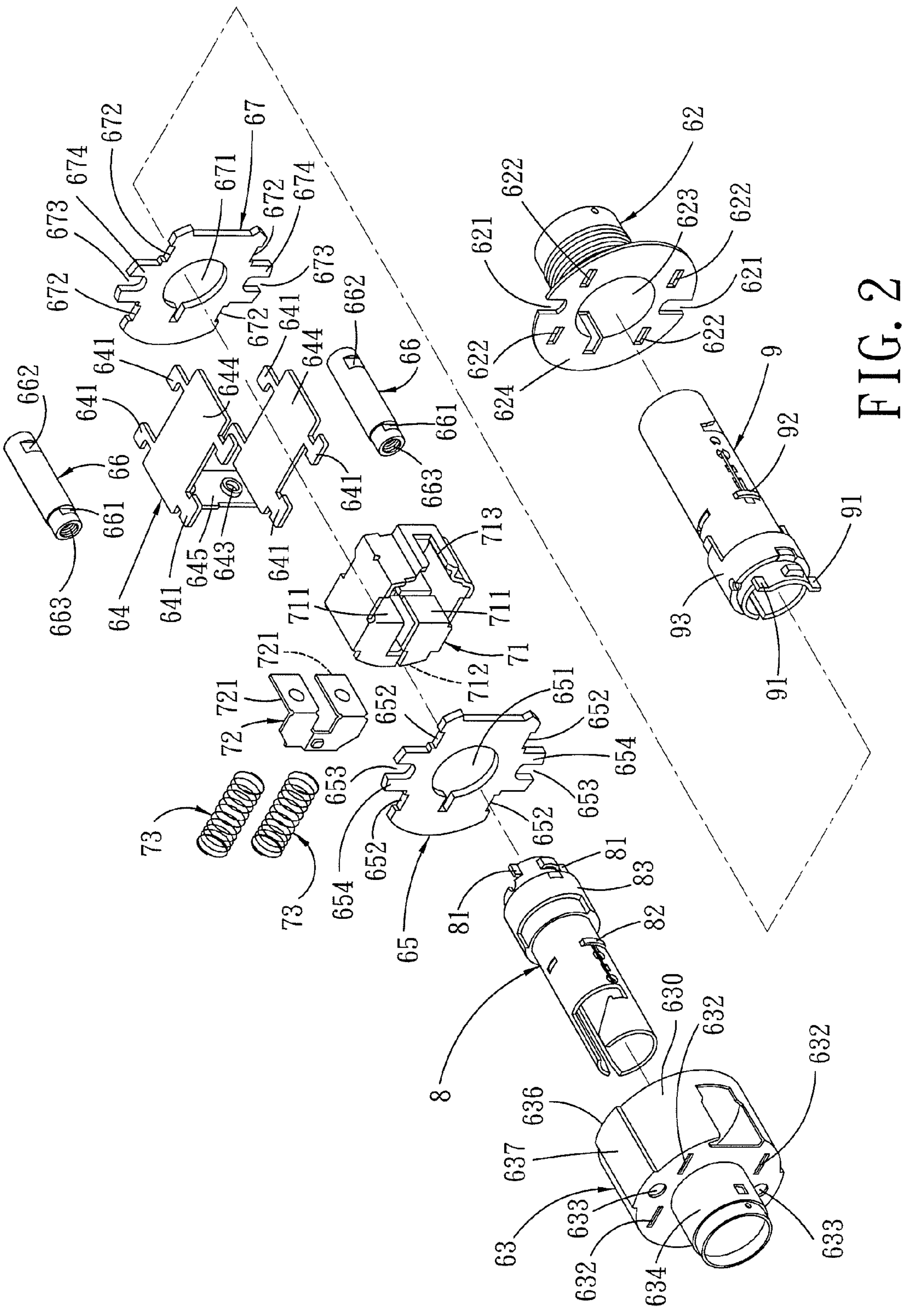
FIG. 2 is an exploded view showing in detail a drive mechanism of the cylinder lock.
Figure 3:
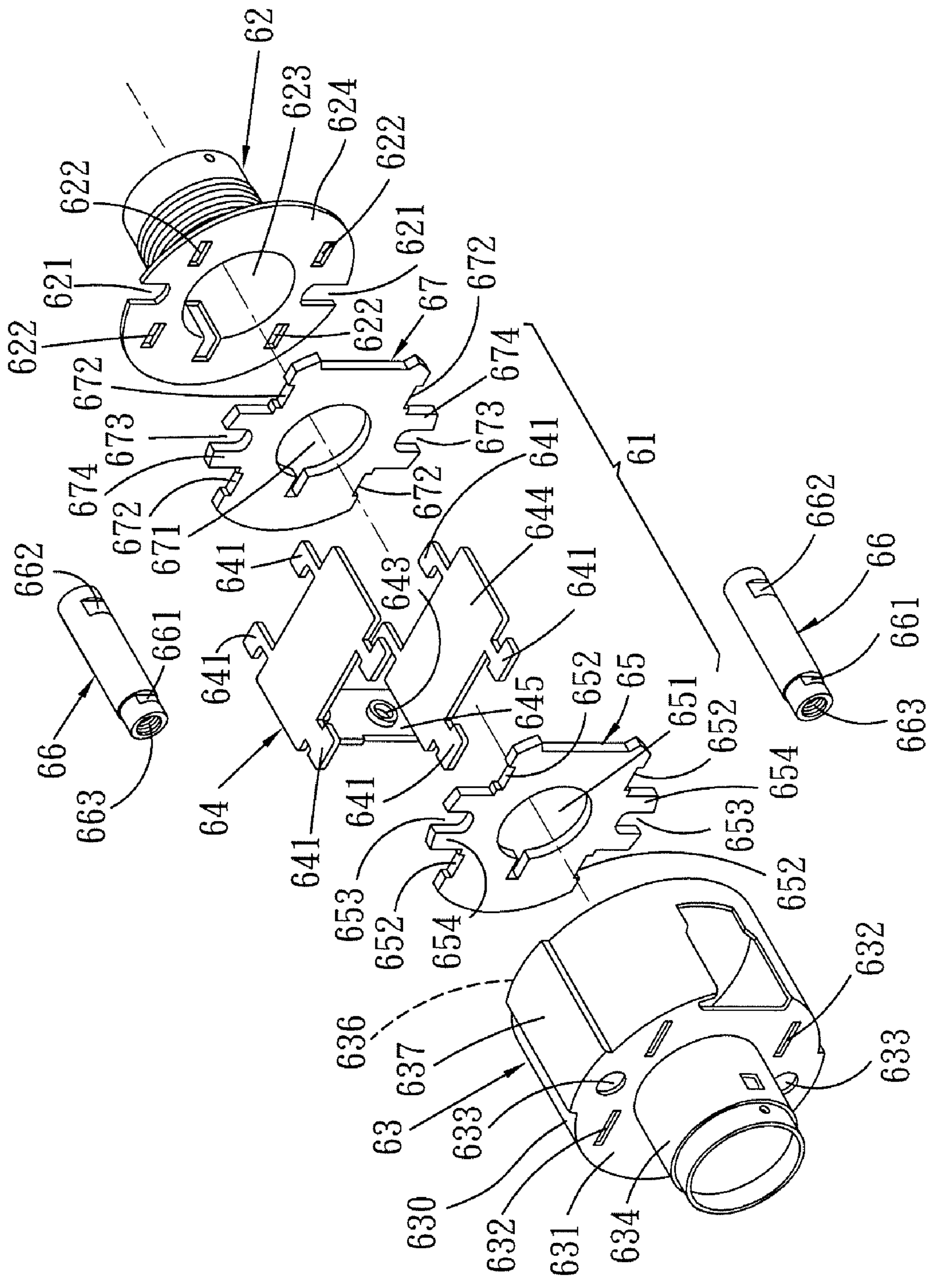
FIG. 3 is the same view as FIG. 2 but omitting some components of the drive mechanism.
Figure 4:
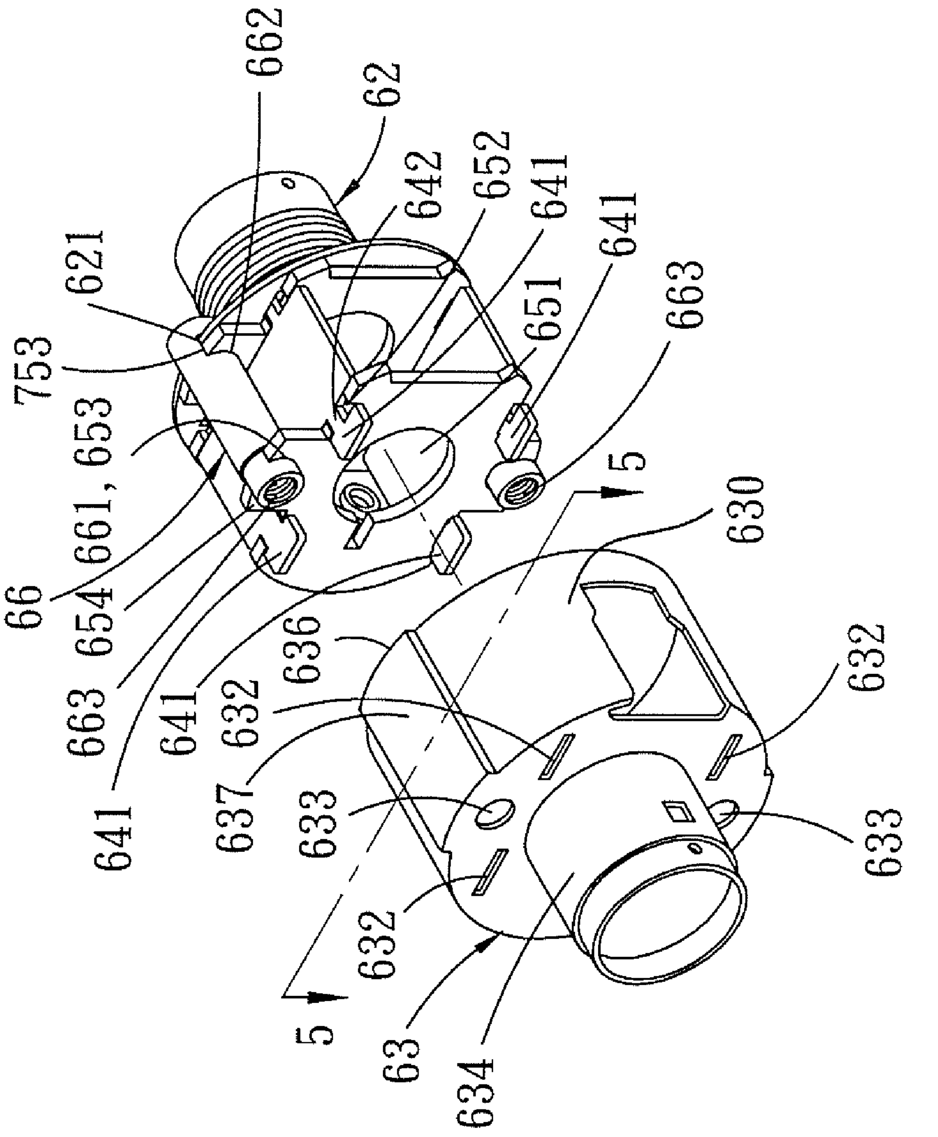
FIG. 4 is an exploded view of the drive mechanism but showing an retractor case in an assembled state.

Referring to FIGS. 1-5, there is shown a cylinder lock embodying the present invention and including inner and outer rose assemblies 4 and 5, inner and outer handles 2 and 1, and a drive mechanism 6 connected to the inner and outer handles 2 and 1.

The drive mechanism 6 includes a retractor case 61, a latch retractor 71, a positioner 72, two biasing springs 73, two reinforcing posts 66, an inner drive spindle 8, and an outer drive spindle 9. The retractor case 61 is disposed within a housing composed of a sleeve 62 and a shell 63.

The retractor case 61 has a middle cage 64 connected between inner and outer cover plates 65 and 67. The middle cage 64 has upper and lower plates 644, and a transverse plate 645 connected between the upper and lower plates 644. Two positioning studs 643 are provided on the transverse plate 645. Each of the upper and lower plates 644 has two opposite ends each of which is provided with a pair of hooks 641.

The inner cover plate 65 has a central hole 651, two tongues 654 respectively and radially projecting at upper and lower ends of the inner cover plate 65, and two pairs of notches 652. Each pair of the notches 652 are provided respectively on two sides of one of the tongues 654. Each tongue 654 is bifurcated to define a clamping groove 653. The notches 652 respectively receive the hooks 641.

The outer cover plate 67 has a central hole 671, two annularly spaced tongues 674 respectively and radially projecting at upper and lower edges of the outer cover plate 67, and two pair of notches 672. Each pair of the notches 672 are respectively provided at two sides of one of the tongues 674. The notches 672 respectively receive the hooks 641. Each tongue 674 is bifurcated to define a clamping groove 673.

The latch retractor 71 has a front end provided with a puller 713 to move a latch element 32 of a latch unit 3. A rear end of the latch retractor 71 has a receiving part 712. A bearing part 711 is disposed between the receiving part 712 and the puller 713.

The positioner 72 is disposed in the receiving part 712 and has two protrusions 721. Each of the biasing springs 73 has one end positioned to one of the protrusions 721 and the other end positioned to one of the positioning studs 643. The latch retractor 71 is thus supported resiliently by the biasing springs 73.

The outer drive spindle 9 has one end provided with two driving tabs 91 to abut against the bearing part 711 of the latch retractor 71. The other end of the outer drive spindle 9 is connected to the outer handle 1. A spring retainer 92 is provided in the outer drive spindle 9 to engage a slot 12 in the outer handle 1 when the outer drive spindle 9 is inserted into a bore 11 of the outer handle 1. A ring 93 is sleeved around the outer drive spindle 9.

The inner drive spindle 8 has one end provided with two driving tabs 81 to abut against the bearing part 711 of the latch retractor 71. The other end of the inner drive spindle 8 is connected to the inner handle 2. The inner drive spindle 8 further has a spring retainer 82 to engage a slot 22 formed in the inner handle 2 when the inner drive spindle 8 is inserted into a bore 21 of the inner handle 2. A ring 83 is sleeved around the inner drive spindle 8.

The sleeve 62 is substantially cylindrical, and has a central bore 623 for insertion of the outer drive spindle 9. An annular flange 624 projects from one end of the sleeve 62. The annular flange 624 is notched radially at two diametrically opposite positions thereof to form two clamping notches 621 which are aligned with the clamping grooves 673 of the outer cover plate 67. Four engaging holes 622 are further provided in the annular flange 624 to connect the hooks 641 of the upper and lower plates 644. Each hook 641 extends through the corresponding engaging hole 622 and is bent so that the sleeve 62 is fixed to the retractor case 61.

The reinforcing posts 66 are disposed within the shell 63, and extend across the middle cage 64 and the inner and outer cover plates 65, 67. Each reinforcing post 66 has two opposite ends respectively clamped by the clamping holes 653, 673 of the inner and outer cover plates 65, 67. Each reinforcing post 66 further has an internal screw hole 663, and first and second engagement slots 661 and 662 in the opposite ends thereof. The first engagement slot 661 of each reinforcing post 66 engages the corresponding tongue 654 within the corresponding clamping groove 653. The second engagement slot 662 of each reinforcing post 66 engages the corresponding tongue 674 within the corresponding clamping groove 673 and also engages the annular flange 624 within the corresponding notch 621.

The shell 63 includes an enlarged tubular section 630 receiving the middle cage 64 and the inner and outer cover plates 65, 67 of the retractor case 61, a constricted tubular section 634, and an annular shoulder 631 formed between the enlarged and constricted tubular sections 630 and 634. The annular shoulder 631 is formed with four apertures 632 and two passage holes 633. The reinforcing posts 66 extend through the passage holes 633, respectively. The inner drive spindle 8 extends into the retractor case 61 through the constricted tubular section 634 and connects the latch retractor 71.

The enlarged tubular section 630 further has two annularly spaced interlocking units 636 to interlock with the retractor case 61 so as to prevent relative rotational movements of the shell 63 and the retractor case 61, thereby improving the structural integrity of the cylinder lock and increasing the resistance to torsional, tension and compressive stresses. In this embodiment, the interlocking units 636 are provided on an inner surface of the enlarged tubular section 630 at two diametrically opposite positions.

Figure 5:
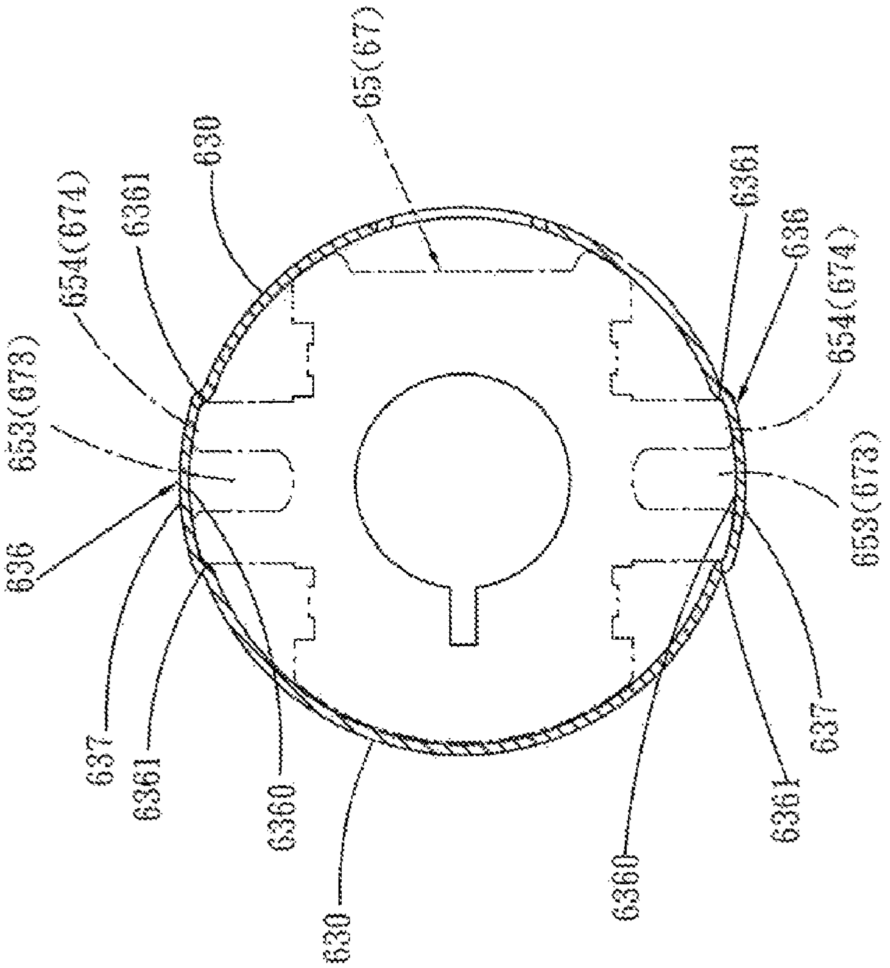
FIG. 5 is a sectional view taken along line 5-5 of FIG. 4.

As best shown in FIG. 5, each interlocking unit 636 includes a pair of axially extending recess sidewalls 6361 that are spaced apart annularly and that define a recess 6360 extending axially in the inner surface of the enlarged tubular section 630. The paired recess sidewalls 6361 serve as a pair of interlocking elements to engage two opposite sides of one tongue 654 and one tongue 674. Each recess 6360 receives one of the tongues 654 and one of the tongues 674 so that both of the tongues 654, 674 extend between and engage one pair of the recess sidewalls 6361.

To provide the recess 6360, the inner surface of the enlarged tubular section 630 is recessed to form the recesses 6360. Preferably, the enlarged tubular section 630 is bent such that the outer surface of the enlarged tubular section 630 projects outwardly where the inner surface thereof is recessed. Therefore, the enlarged tubular section 630 has two protruding parts 637 that project outwardly at two diametrically opposite positions.

Alternatively, each interlocking unit 636 may have two pairs of protrusions (not shown) which are aligned axially. Each pair of the protrusions are spaced apart annularly and project from the inner surface of the enlarged tubular section 630. One pair of the protrusions may engage one of the tongues 654, and the other pair of the protrusions may engage one of the tongues 674.

In operation, the outer or inner handle 1, 2 may be rotated to turn the outer or inner drive spindle 9, 8 which in turn will drive the latch retractor 71 to retract the latch 32 of the latch unit 3. During the operation of the cylinder lock, the outer drive spindle 9, the middle cage 64 and the outer cover plate 67 are the components which are most likely to be damaged. Due to the interlocking of the tongues 654, 674 of the inner and outer cover plates 65, 67 with the interlocking units 636 of the shell 63, the entire structure of the cylinder lock is strengthened, and the resistance of the cylinder lock to torsional, tensile and compressive stresses is improved.

Figure 6:
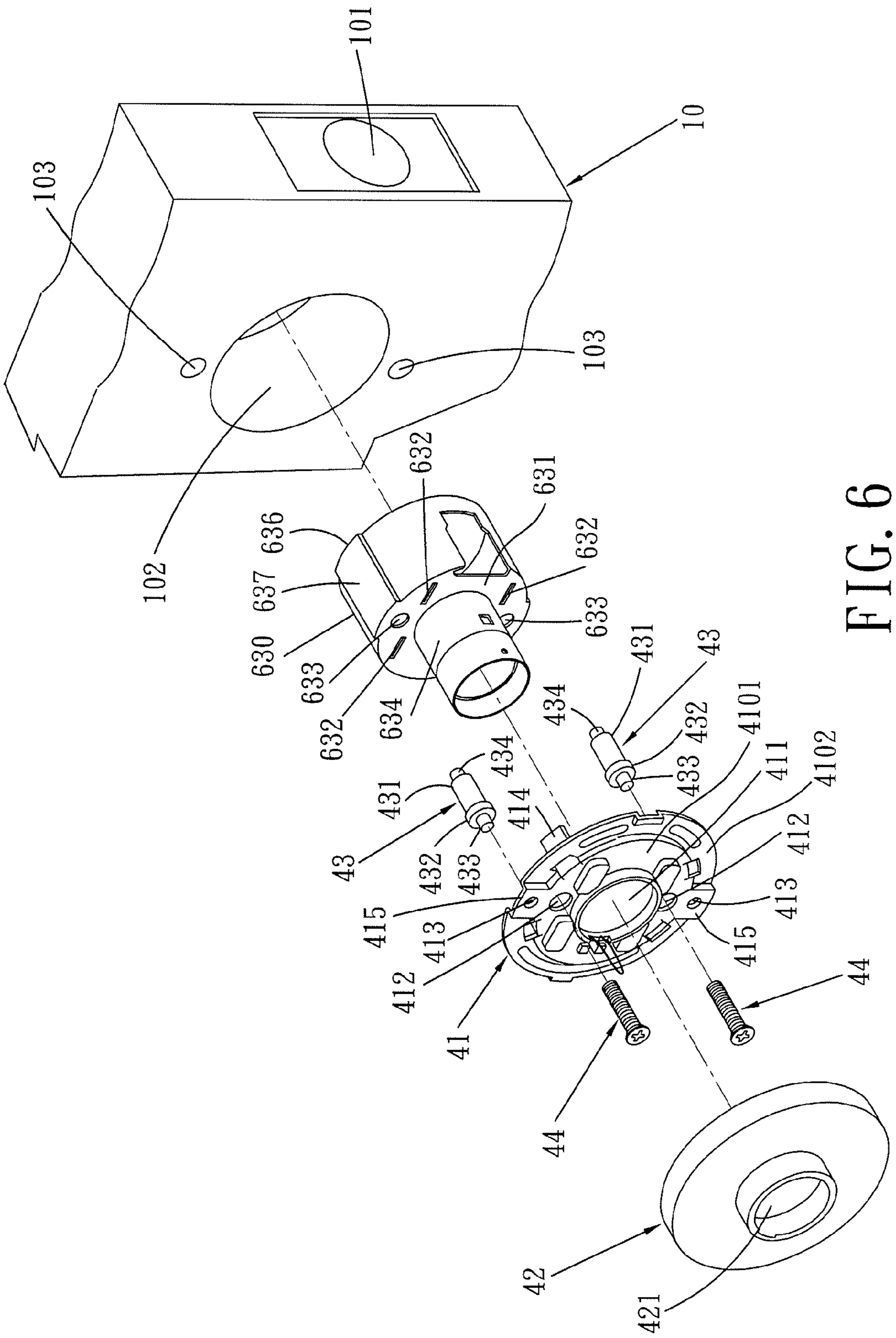
FIG. 6 is an exploded view illustrating the mounting of a shell and a rose assembly of the cylinder lock on a door panel.
Figure 7:
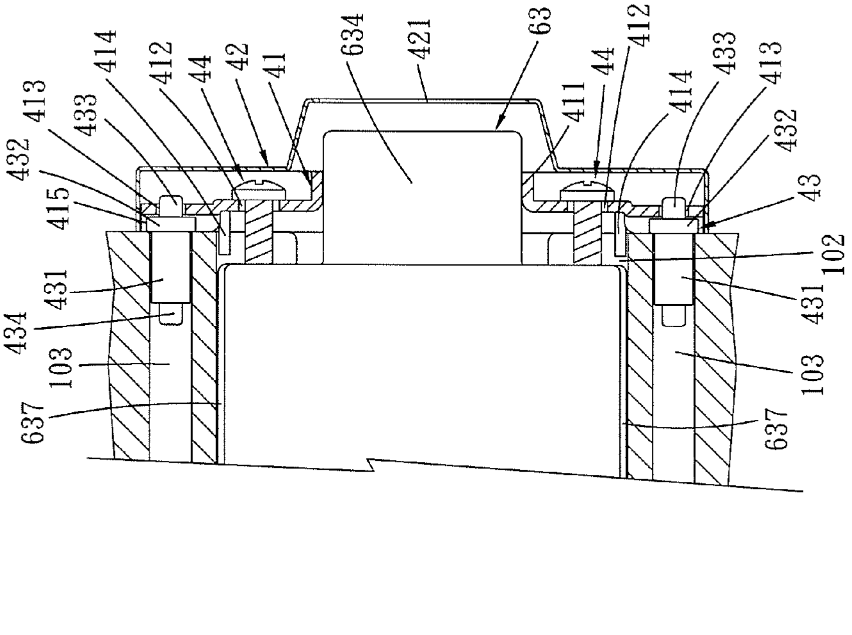
FIG. 7 is a fragmentary sectional view showing that the shell and the rose assembly are mounted on the door panel.

Referring to FIGS. 6-7, there is shown a door panel 10 for mounting the cylinder lock of the preferred embodiment therein. The door panel 10 has a latch hole 101, a lock hole 102, and two positioning holes 103. The inner rose assembly 4 includes a rose disc 41 with a middle hole 411, and a rose cover 42 with a middle hole 421.

The rose disc 41 further has inner and outer annular sections 4101 and 4102. The inner annular section 4101 extends between the middle hole 411 and the outer annular section 4102. The outer annular section 4102 extends outwardly from and is disposed around the inner annular section 4101. A plurality of prongs 414 project axially from the rose disc 41 in a direction away from the rose cover 42, i.e. toward the enlarged tubular section 630. The prongs 414 are spaced apart from each other along a connection between the inner and outer annular sections 4101, 4102. The outer annular section 4102 has two annularly spaced apart positioning holes 413, and two positioning elements 43 to position the rose disc 41 to the door panel 10.

Specifically, the positioning holes 413 are provided at two diametrically opposite positions of the outer annular section 4102. The positioning elements 43 respectively extend through the positioning holes 413 and are inserted into the respective positioning holes 103 in the door panel 10. Each positioning element 43 has first, second and third sections 431, 432, 433, and a guide end 434. The second section 432 is larger in cross section than the first section 431, and the third section 433 is smaller in cross section than the second section 432.

The outer annular section 4101 further has two indented parts 415 which are indented at an inner side of the rose disc 41 and at two diametrically opposite positions. The positioning holes 413 are provided respectively in the indented parts 415. The inner annular section 4101 and the indented parts 415 project outwardly at an outer side of the rose disc 41 that faces the rose cover 42, and are indented at the inner side of the rose disc 41. The indented parts 415 and the inner annular section 4101 are flush with each other at the inner and outer sides of the rose disc 41.

The inner annular section 4101 of the rose disc 41 has two fastening holes 412 respectively aligned with the passage holes 633 in the annular shoulder 631 of the shell 63. Two fasteners 44 are provided to couple the rose disc 41 to the shell 63 and to the retractor case 61.

Preferably, the fastening holes 412 are aligned with the positioning holes 413 and the center of the middle hole 411 of the rose disc 41 along a diametral line.

To install the cylinder lock on the door panel 10, the shell 63 is inserted into the lock hole 102, the rose disc 41 and the rose cover 42 are disposed around the constricted tubular section 634 of the shell 63, and the prongs 414 are fitted in the lock hole 102.

The guide ends 434 of the positioning elements 43 are used to guide the insertion of the positioning elements 43 into the positioning holes 103. After insertion of the positioning elements 43, the first sections 431 extend in the respective positioning holes 103 in the door panel 10, the second sections 432 are received in the respective indented parts 415, and the third sections 433 extend through the respective positioning holes 413.

When the fasteners 44 are inserted threadedly into the respective reinforcing posts 66 bypassing the same through the respective passage holes 633 and the respective fastening holes 412, the rose disc 41 is fastened to the shell 63 and the retractor case 61.

Figure 9:
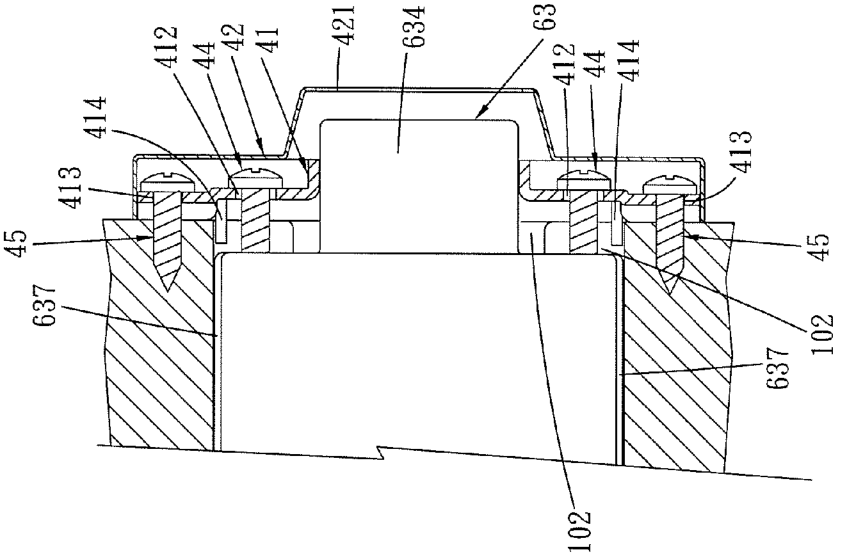
FIG. 9 is a fragmentary sectional view showing that the shell and the rose assembly shown in FIG. 8 are mounted on the door panel.
Figure 8:
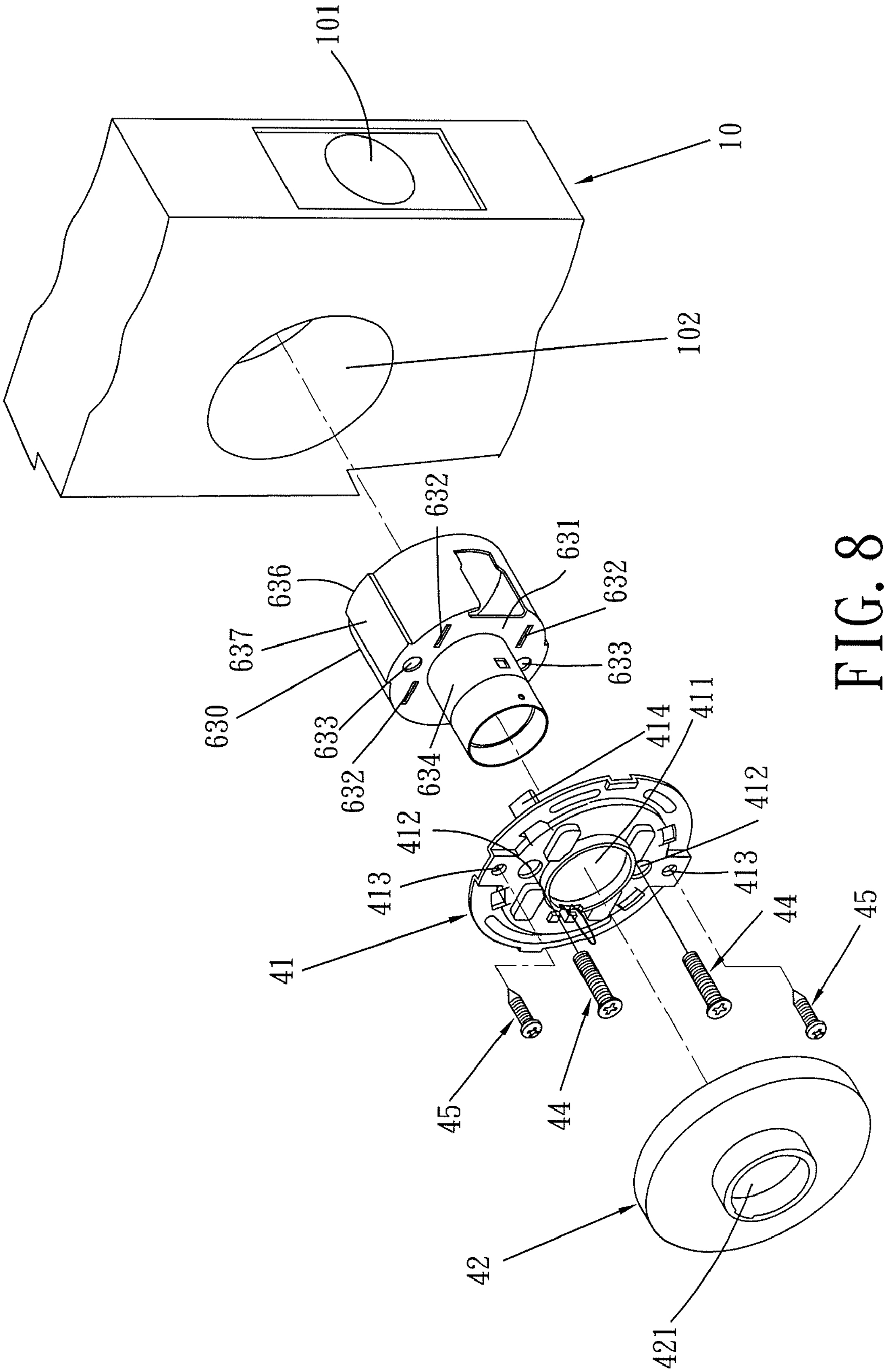
FIG. 8 is an exploded view showing the mounting of the shell and the rose assembly on the door panel in an alternative fashion.

Referring to FIGS. 8 and 9, when the door panel 10 is not provided with the positioning holes 103 shown in FIG. 6, the positioning elements 43 (see FIG. 6) may be replaced with a pair of self-tapping screws 45 which can itself cut into the door panel 10 so as to be fixed therein.

It is worth mentioning that, after the cylinder lock of the present invention is mounted on a door panel as shown in FIGS. 7 and 9, the protruding parts 637 of the enlarged tubular section 630 project towards the inner wall surface of the lock hole 102 at top and bottom sides of the lock hole 102. As such, drooping or downward tilting of the inner and outer handles 2, 1 can be alleviated or even eliminated.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A cylinder lock comprising:

an inner handle;

an inner drive spindle connected to said inner handle;

an outer handle;

an outer drive spindle connected to said outer handle;

a latch retractor driven by said inner or outer drive spindle and adapted to retract a latch;

a retractor case having inner and outer cover plates, and a middle cage connected between said inner and outer cover plates and receiving said latch retractor, each of said inner and outer cover plates having a central hole, and two radially extending and annularly spaced tongues, each of said tongues of said inner and outer cover plates being bifurcated to define a clamping groove therein;

a shell having an enlarged tubular section, a constricted tubular section, and an annular shoulder formed between said enlarged and constricted tubular sections and adjacent said inner cover plate, said enlarged tubular section receiving said retractor case, said annular shoulder having two passage holes; and two annularly spaced reinforcing posts which are disposed inside said enlarged tubular section across said middle cage and said inner and outer cover plates and each of which has two opposite ends, said opposite ends of said reinforcing posts being respectively clamped by said clamping grooves of said tongues, said reinforcing posts respectively being aligned with said passage holes;

wherein said inner surface of said enlarged tubular section is recessed to form at least two annularly spaced recesses that extend axially of said enlarged tubular section, each of said recesses being confined by two axially extending recess sidewalls that are spaced apart annularly, each of said tongues extending into a respective one of said recesses and having two opposite sides engaging said recess sidewalls of said one of said recesses; and wherein each of said reinforcing posts has two engagement slots formed respectively in said opposite ends thereof, each of said engagement slots of each of said reinforcing posts engaging an edge of a corresponding one of said tongues within a corresponding one of said clamping grooves.

2. The cylinder lock of claim 1, wherein said enlarged tubular section further has an outer surface opposite to said inner surface, and said outer surface projects outwardly where said inner surface is recessed, thus forming a protruding part.

3. The cylinder lock of claim 1, further comprising two fasteners, and a rose disc disposed around said constricted tubular section and having a middle hole, and two fastening holes, said fasteners extending respectively through said fastening holes and inserted threadedly and respectively into said reinforcing posts.

4. The cylinder lock of claim 3, wherein said rose disc further has inner and outer annular sections, and a plurality of prongs, said inner annular section extending between said middle hole and said outer annular section, said outer annular section extending outwardly from said inner annular section, said prongs projecting axially from said rose disc in a direction toward said enlarged tubular section and being spaced apart annularly from each other along a connection between said inner and outer annular sections.

5. The cylinder lock of claim 4, further comprising two positioning elements, said outer annular section having two positioning holes, said positioning elements respectively extending through said positioning holes, said fastening holes being formed in said inner annular section, said positioning and fastening holes being aligned along a diametral line.

6. The cylinder lock of claim 5, wherein said rose disc further has an inner side facing said enlarged tubular section, and an outer side opposite to said inner side, said outer annular section further having two indented parts which are indented at said inner side, said positioning holes being provided respectively in said indented parts.

7. The cylinder lock of claim 6, wherein each of said positioning elements has first, second and third sections, said second section being formed between said first and third sections, said first section being adapted to be received in a panel, said second section being larger in cross section than that of said first section and received in one of said indented parts, said third section being smaller in cross section than that of said second section and extending into one of said positioning holes.

8. A cylinder lock comprising:

an inner handle;

an inner drive spindle connected to said inner handle;

an outer handle;

an outer drive spindle connected to said outer handle;

a latch retractor driven by said inner or outer drive spindle and adapted to retract a latch;

a retractor case having inner and outer cover plates, and a middle cage connected between said inner and outer cover plates and receiving said latch retractor, each of said inner and outer cover plates having a central hole, and a pair of radially extending tongues, each of which is bifurcated to define a clamping groove therein:

a shell having an enlarged tubular section, a constricted tubular section, and an annular shoulder formed between said enlarged and constricted tubular sections and adjacent said inner cover plate, said enlarged tubular section receiving said retractor case, said annular shoulder having two passage holes; and a pair of reinforcing posts, each of which is disposed inside said enlarged tubular section across said middle cage and said inner and outer cover plates and having two opposite ends, said opposite ends of said reinforcing posts being respectively clamped by said clamping grooves of said tongues, said reinforcing posts being aligned with said passage holes, respectively;

wherein said inner surface of said enlarged tubular section is recessed to form a recess that extends axially of said enlarged tubular section and that is confined by two axially extending recess sidewalls, which are spaced apart annularly, one of said tongues extending into said recess and having two opposite sides engaging said recess sidewalls, respectively; and wherein each of said reinforcing posts has two engagement slots formed respectively in said opposite ends thereof, each of said engagement slots engaging an edge of a corresponding one of said tongues within a corresponding one of said clamping grooves.

* * * * *